(12) United States Patent  
Attia

(10) Patent No.: US 9,014,861 B2  
(45) Date of Patent: Apr. 21, 2015

(54) METHOD AND SYSTEM FOR NOISE-CONTROLLED OPERATION OF A WIND TURBINE

(75) Inventor: Sid Ahmed Attia, Berlin (DE)

(73) Assignee: General Electric Company, Schenectady, NY (US)

(*) Notice: Subject to any disclaimer, the term of this patent is extended or adjusted under 35 U.S.C. 154(b) by 521 days.

(21) Appl. No.: 13/331,027

(22) Filed: Dec. 20, 2011

(65) Prior Publication Data

US 2013/0154263 A1 Jun. 20, 2013

(51) Int. Cl.

| | |
|---|---|
| *G05B 13/00* | (2006.01) |
| *G05B 15/00* | (2006.01) |
| *G05D 3/12* | (2006.01) |
| *G05D 11/00* | (2006.01) |
| *G05D 17/00* | (2006.01) |
| *F03D 9/00* | (2006.01) |
| *H02P 9/04* | (2006.01) |
| *F01D 7/00* | (2006.01) |
| *B63H 3/00* | (2006.01) |

(Continued)

(52) U.S. Cl.
CPC ............ *F03D 7/0224* (2013.01); *F03D 7/0272* (2013.01); *F03D 7/0296* (2013.01); *F05B 2270/32* (2013.01); *H02P 9/007* (2013.01); *H02P 2101/15* (2013.01); *Y02E 10/723* (2013.01)

(58) Field of Classification Search
CPC ............... F05B 2260/96; F05B 2270/1033; F05B 2270/333; F05B 2270/32; F05B 2270/327; F05B 2270/335; F05B 2240/96; F05B 2260/70; F05B 2270/101; F05B 2270/328; F03D 7/0224; F03D 7/028; F03D 7/0296; F03D 7/042; F03D 7/0276; F03D 7/0272; F03D 7/048; F03D 9/002; Y02E 10/723; Y02E 10/721; Y02E 10/722; Y02E 10/725; Y02E 10/74; H02P 2009/004; H02P 9/00; H02P 9/02; H02P 9/04; H02P 9/008; G01P 5/07; G05B 13/021
USPC ................ 700/275, 280, 286, 287, 289, 290; 290/7, 43, 44, 54, 55; 416/1, 31, 36, 416/37, 61; 73/1.16, 1.34, 1.37, 1.75, 1.88
See application file for complete search history.

(56) References Cited

U.S. PATENT DOCUMENTS

| | | | |
|---|---|---|---|
| 7,081,689 B2* | 7/2006 | Tilscher et al. | 290/44 |
| 7,352,076 B1* | 4/2008 | Gabrys | 290/44 |

(Continued)

FOREIGN PATENT DOCUMENTS

| | | |
|---|---|---|
| EP | 2216549 A2 | 8/2010 |
| EP | 2273105 A2 | 1/2011 |

(Continued)

*Primary Examiner* — Crystal J Barnes-Bullock
(74) *Attorney, Agent, or Firm* — Global Patent Operation; Douglas D. Zhang

(57) ABSTRACT

A method for noise-reduced operation a wind is provided. The method includes determining a wind speed during normal operation of the wind turbine and determining a weighted rotor speed setpoint for a rotor of the wind turbine so that a noise emission of the wind turbine for the wind speed is reduced compared to nominal noise emission of the wind turbine at the wind speed. Using the weighted rotor speed setpoint, a torque setpoint for a power conversion assembly connected to the rotor is determined. The torque setpoint is applied to the power conversion assembly to control the wind turbine.

17 Claims, 8 Drawing Sheets

(51) Int. Cl.
  B63H 7/00 (2006.01)
  B64C 11/30 (2006.01)
  F03B 3/12 (2006.01)
  F03D 7/02 (2006.01)
  H02P 9/00 (2006.01)

(56) References Cited

U.S. PATENT DOCUMENTS

| | | | | |
|---|---|---|---|---|
| 7,823,437 | B2* | 11/2010 | Siebers et al. | 73/1.37 |
| 7,896,613 | B2* | 3/2011 | Xiong | 416/1 |
| 7,902,689 | B2* | 3/2011 | Kinzie et al. | 290/55 |
| 7,936,078 | B2* | 5/2011 | Pavlak | 290/44 |
| 7,945,350 | B2* | 5/2011 | Kinzie et al. | 700/280 |
| 7,964,979 | B2* | 6/2011 | Miranda et al. | 290/44 |
| 8,013,460 | B2 | 9/2011 | Kinzie et al. | |
| 8,021,110 | B2* | 9/2011 | Kerber | 416/1 |
| 8,304,926 | B2* | 11/2012 | Attia | 290/44 |
| 8,426,994 | B2* | 4/2013 | Nielsen et al. | 290/44 |
| 2010/0133817 | A1 | 6/2010 | Kinzie et al. | |
| 2010/0135798 | A1 | 6/2010 | Eggleston | |
| 2010/0143119 | A1 | 6/2010 | Kooijman et al. | |
| 2011/0006527 | A1 | 1/2011 | Kinzie et al. | |
| 2011/0089693 | A1* | 4/2011 | Nasiri | 290/44 |
| 2011/0164975 | A1* | 7/2011 | Vyas | 416/1 |
| 2011/0175356 | A1 | 7/2011 | Nielsen et al. | |
| 2011/0223006 | A1 | 9/2011 | Loh et al. | |
| 2012/0027590 | A1 | 2/2012 | Bonnet | |
| 2012/0148402 | A1* | 6/2012 | Kabatzke et al. | 416/1 |
| 2013/0257051 | A1* | 10/2013 | Spruce et al. | 290/44 |
| 2013/0270827 | A1* | 10/2013 | Couchman et al. | 290/44 |
| 2014/0017081 | A1* | 1/2014 | Esbensen et al. | 416/1 |

FOREIGN PATENT DOCUMENTS

| | | |
|---|---|---|
| EP | 2273109 A1 | 1/2011 |
| EP | 02273109 A1 | 1/2011 |
| EP | 2306004 A2 | 4/2011 |
| EP | 1944667 B1 | 7/2011 |
| WO | 2010061255 A2 | 6/2010 |

\* cited by examiner

METHOD AND SYSTEM FOR NOISE-CONTROLLED OPERATION OF A WIND TURBINE

BACKGROUND OF THE INVENTION

The subject matter described herein relates generally to methods and systems for the control of noise emissions in wind turbines, and more particularly, to methods and systems for balancing noise emission and power production of wind turbines.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with pre-defined rated power limits. To operate within such rated power limits, the electrical and/or mechanical components may be operated with large margins for the operating limitations. Such operation may result in inefficient wind turbine operation, and a power generation capability of the wind turbine may be underutilized.

During normal operation, wind turbines with sophisticated control systems maintain constant speed and power by active blade pitch control. In addition, wind turbines have a controller which adjusts the pitch angle of the blade to optimize energy captured below rated winds and regulates power above rated winds. The controller may utilize a fixed fine pitch angle in the variable speed region and adjust the pitch in above rated wind speed depending on the power output and rotational speed of the turbine.

Although wind turbines do not emit greenhouse gases, a concern related to wind turbines is the emission of noise pollution. As such, the ability to control and/or manage perceived acoustic emissions of wind turbines facilitates integrating wind turbines into society.

Methods for reducing the noise emissions of wind energy systems have long been discussed. For example, it has been proposed to reduce aerodynamic noise caused by the blades through a speed/torque control of the system in order to keep turbine speed low during certain time intervals, e.g., during night time or other times in which reduced noise is desired. However, such derating greatly reduces the power production. Another proposed method to reduce noise emission is to reduce rotor rotational speed of certain wind turbines in a wind park individually, also referred to as "derating" the wind turbine in order to gain maximum overall performance of the system while meeting park noise constraints. Such selective derating of individual turbines permits a number of wind turbines to run at significantly higher speeds than the average speed of all the remaining turbines. This proposed solution provides greater power capture than a complete derating of the park, but provides reduced noise control and operation at reduced power coefficients.

It would be beneficial to provide a method and system in which the turbine can be controlled so that the trade-off between power production and noise level can be flexibly adjusted.

BRIEF DESCRIPTION OF THE INVENTION

In one aspect, a method for noise-reduced operation a wind turbine is provided. The method includes determining a wind speed during normal operation of the wind turbine and determining a weighted rotor speed setpoint for a rotor of the wind turbine so that a noise emission of the wind turbine for the wind speed is reduced compared to nominal noise emission of the wind turbine at the wind speed. Using the weighted rotor speed setpoint, a torque setpoint for a power conversion assembly connected to the rotor is determined. The torque setpoint is applied to the power conversion assembly to control the wind turbine.

In another aspect, a method for noise-reduced operation a wind turbine is provided. The method includes determining an expected wind speed, and determining, using the expected wind speed, a weighted rotor speed setpoint for a rotor of the wind turbine that is lower than a rated rotor speed the rotor. The weighted rotor speed setpoint is used as a command variable for a rotor speed of the rotor used as a controlled variable for controlling the wind turbine during partial-load operation of the wind turbine.

In yet another aspect, a control system for controlling a wind turbine is provided. The control system includes a wind speed module configured to determine a wind speed, and a rotor speed control module connected with the wind speed module for receiving the wind speed and configured to determine, depending on the wind speed, a weighted rotor speed setpoint for a rotor of the wind turbine so that a noise emission of the wind turbine for the wind speed is reduced compared to nominal noise emission of the wind turbine at the wind speed. The control system further includes a torque control module connected with the rotor speed module for receiving the weighted rotor speed setpoint. The torque control module is configured to determine, using the weighted rotor speed setpoint, a torque setpoint for a power conversion assembly of the wind turbine. The power conversion assembly includes a generator connected to the rotor. The torque control module is further configured to issue the torque setpoint to the power conversion assembly of the wind turbine.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include methods and a control system for controlling a wind turbine having a rotor with variable rotor speed that allows reduced noise operation of the wind turbine. More specifically, the methods and the control system facilitate a trade-off between power production and noise emission of the wind turbine in a flexible manner.

As used herein, the term "noise" is intended to be representative of a sound pressure level generated by the wind turbine and/or the external condition(s) including, but not limited to, wind speed, pressure, temperature, humidity, or the habitation of a nearby structure or structures (for example, a residence). The noise emission may, for example, be a sound power level or a perceived noise. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "normal operation" of the wind turbine intends to describe an operational mode of the wind turbine in which the wind turbine generates electrical power. As used herein, the term "partial-load operation" of the wind turbine intends to describe an operational mode of the wind turbine in which the wind turbine generates electrical power at wind speeds below a rated wind speed of the wind turbine. As used herein, the term "full-load operation" of the wind turbine intends to describe an operational mode of the wind turbine in which the wind turbine generates electrical power at wind speeds that are equal or higher than the rated wind speed of the wind turbine.

Figure 1:
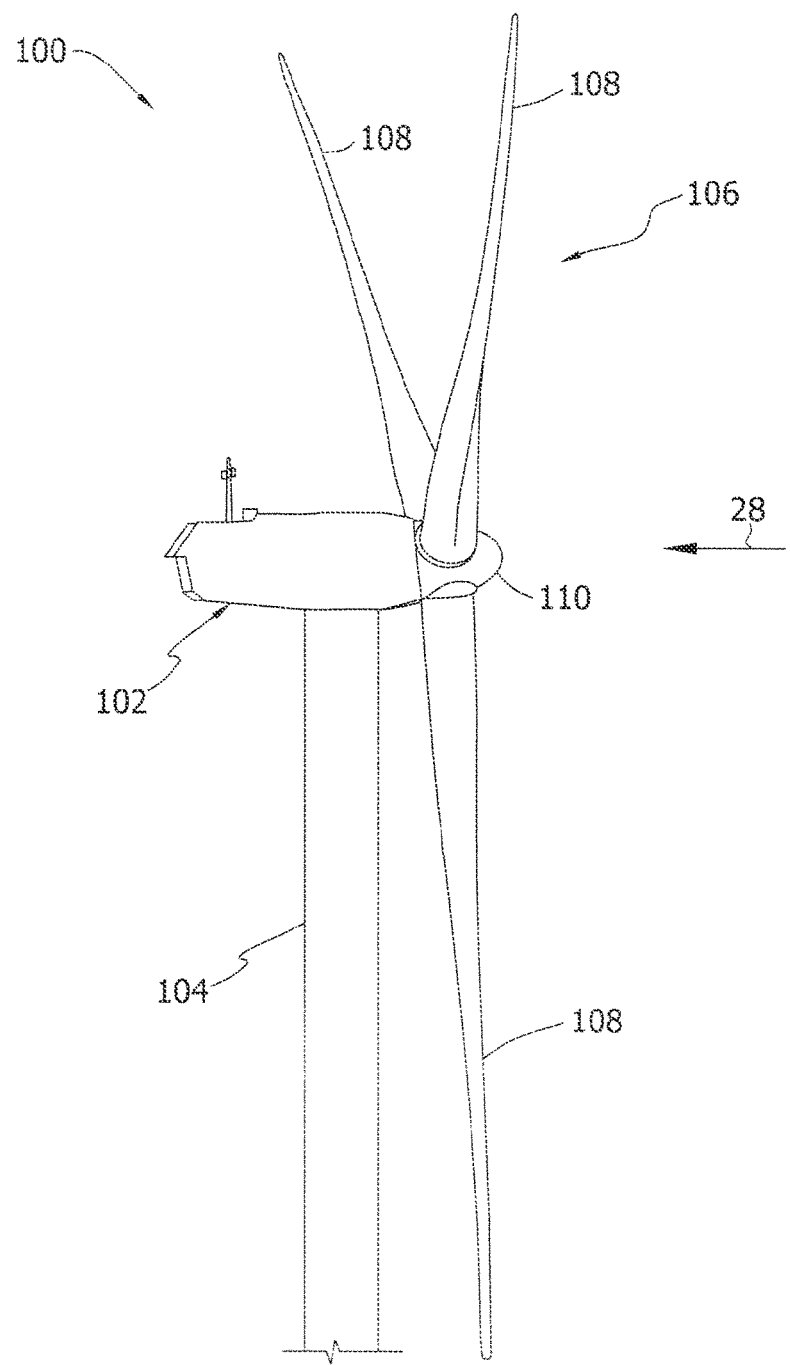
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
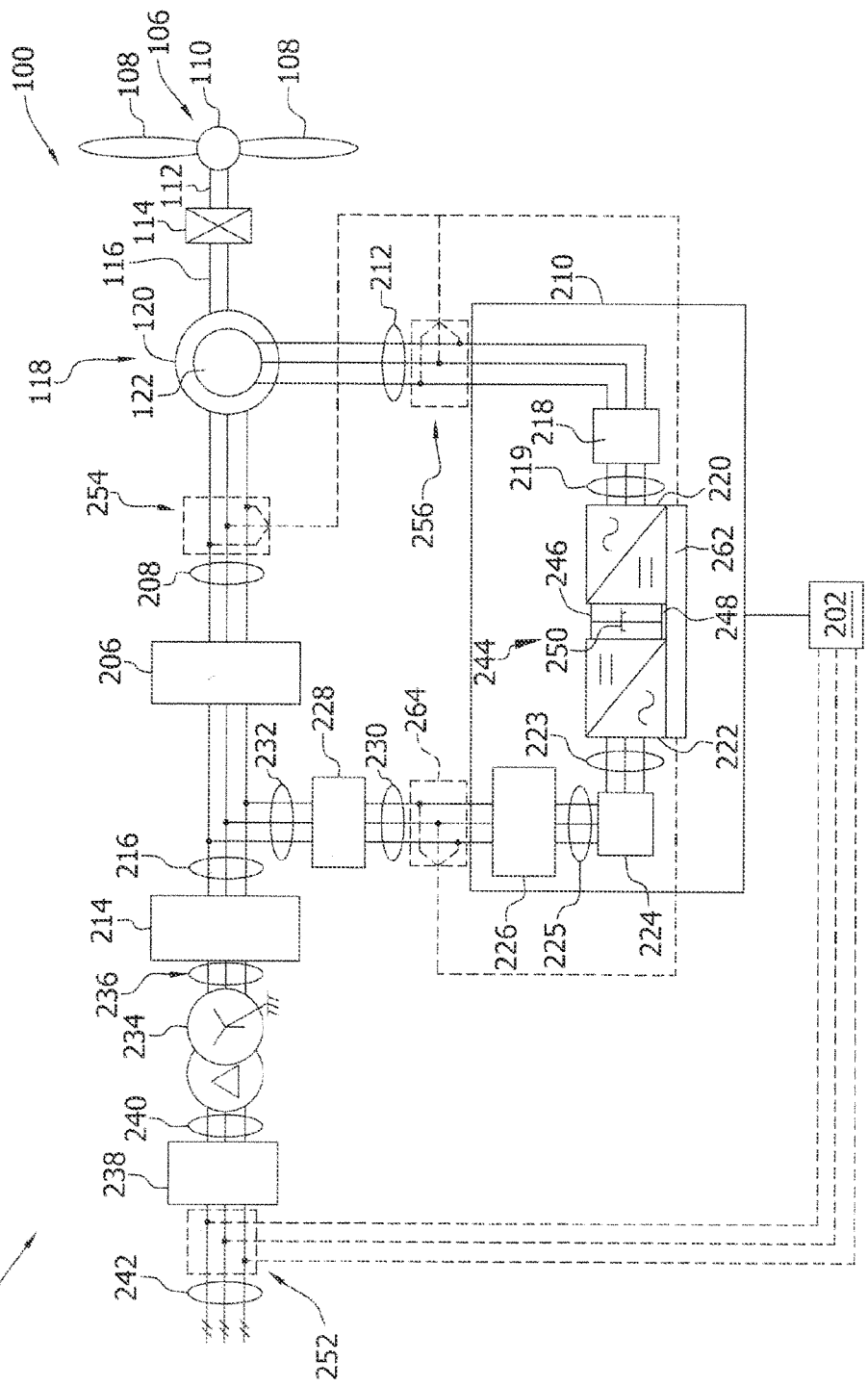
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
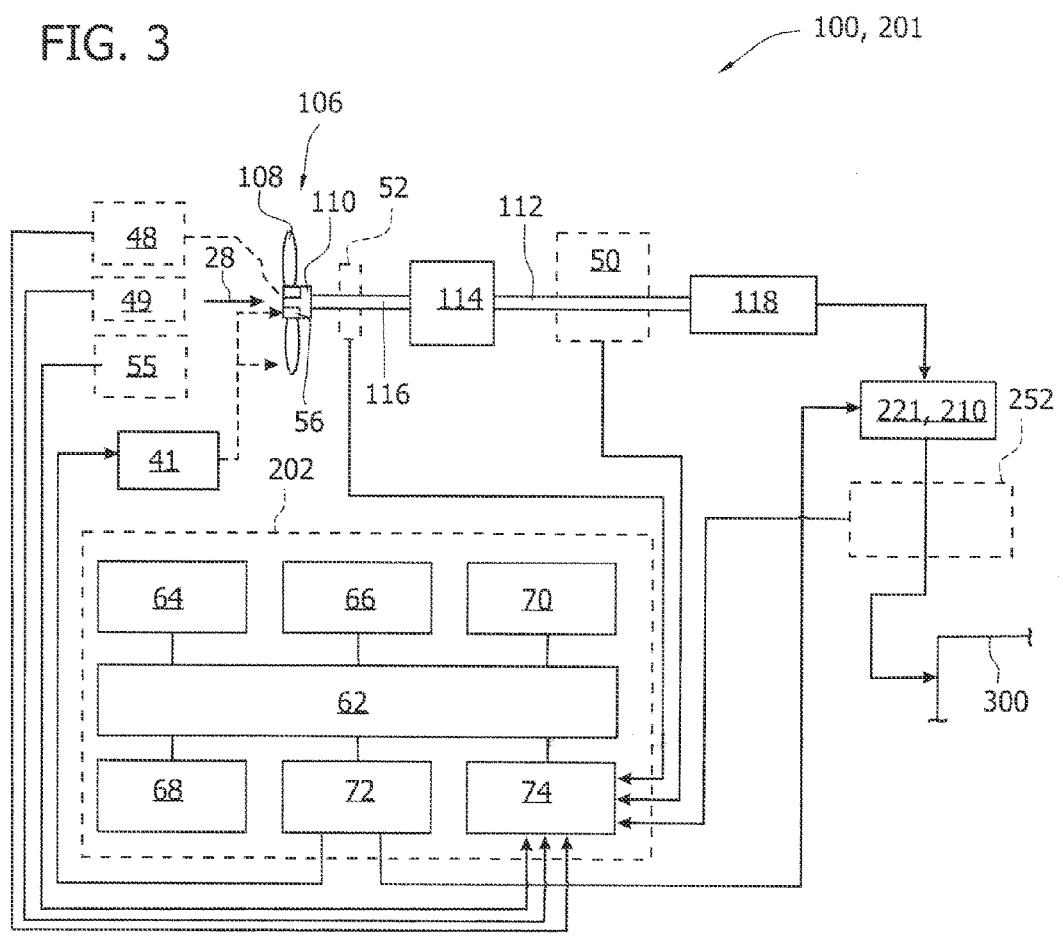
FIG. 3 is a schematic view of an exemplary electrical and control system suitable for use with the wind turbine shown in FIG. 1.

FIG. 3 is a schematic view of a further exemplary electrical and control system 201 that may be used with wind turbine 100. Wind turbine 100 includes an electrical generator 118 coupled to rotor 106 for generating electrical power from the rotational energy generated by rotor 106. In the exemplary embodiment, generators shaft 112 is coupled to low speed shaft 122 through a gearbox 114. The torque of rotor 106 drives the generator rotor to thereby generate variable frequency AC electrical power from rotation of rotor 106. In the exemplary embodiment, power conversion assembly 210 is formed by a frequency converter 221 coupled to generator 118 for converting the variable frequency AC to a fixed frequency AC for delivery to an electrical load, such as, but not limited to, a power grid 300. Frequency converter 221 may be located anywhere within or remote to wind turbine 100. For example, in the exemplary embodiment, frequency converter 221 is located within a base (not shown) of wind turbine tower.

Wind turbine 100 includes one or more control systems coupled to some or all of the components of wind turbine 100 for generally controlling operation of wind turbine 100 and/or some or all of the components thereof (whether or not such components are described and/or illustrated herein), and in particular for controlling the rotational speed of the rotor 106, including the tip speed of the blades 108 and the pitch angle of the blade 108. In the exemplary embodiment, a turbine controller 202 operates as a primary controller. For example, in the exemplary embodiment, turbine controller 202 is coupled to a rotor controller 41 operating as a secondary controller for generally controlling rotor 106. Turbine controller 202 may be used for, but is not limited to, noise level versus power generation monitoring and control including, for example, pitch and speed regulation, high-speed shaft and yaw brake application, yaw and pump motor application, and/or fault monitoring. Alternative distributed or centralized control architectures may be used in some embodiments.

In some embodiments, wind turbine 100 may include a disc brake or other braking mechanism (not shown) for braking rotation of rotor 106 to, for example, slow rotation of rotor 106, brake rotor 106 against full wind torque, and/or reduce the generation of electrical power from electrical generator 118. Furthermore, in some embodiments, wind turbine 100 may include a yaw system (not shown in FIG. 3) for rotating nacelle about an axis of rotation, for changing a yaw of rotor 106, and more specifically for changing the direction faced by rotor 106.

In some embodiments, wind turbine 100 may include an anemometer 49 for measuring wind speed and/or wind direction 28. Anemometer 49, in some embodiments, may be coupled to turbine controller 202 for sending measurements to turbine controller 202 for processing thereof.

Electrical and control system 201 of wind turbine 100 may include a plurality of sensors 48, each coupled to a corresponding blade 108 for measuring a pitch of each blade 108 mounted to rotor hub 110, or more specifically an angle of each blade 108 with respect to a wind direction 28 and/or with respect to rotor hub 110. Sensors 48 may be any suitable sensor having any suitable location within or remote to wind turbine 100, such as, but not limited to, optical encoders within pitch system 56. In some embodiments, sensors 48 are coupled to turbine controller 202 forming a main control system. Sensors 48 are coupled to turbine controller 202. In the exemplary embodiment, pitch system 56 is controlled by rotor controller 41 controlled by turbine controller 202. In other embodiment, pitch system 56 is directly controlled by turbine controller 202.

Wind turbines 100 may also include one or more sensors 50 coupled to low speed shaft 116 for measuring a speed of low speed shaft 116 and/or a torque of low speed shaft 116. Sensor(s) 50 may be any suitable sensor having any suitable location within or remote to wind turbine 100, such as, but not limited to, optical encoders, digital proximity sensors, strain gages, and/or tachometers. In some embodiments, sensor(s) 50 are coupled to turbine controller 202 for sending speed measurements to turbine controller 202 for processing thereof.

Electrical and control system 201 may also include one or more sensors 52 coupled to high speed shaft 112 for measuring a speed of rotation of high speed shaft 112 connected to generator 118 and/or a torque of high speed shaft 112. Sensor(s) 52 may be any suitable sensor having any suitable location within or remote to wind turbine 10, such as, but not limited to, optical encoders, digital proximity sensors, piezo-electric transducers, strain gages, and/or tachometers. In some embodiments, sensor(s) 52 are coupled to turbine controller 202 for sending measurements to turbine controller 202 for processing thereof.

Electrical and control system 201 may also include one or more sensors 252 coupled to generator 118 for measuring an electrical power output of generator 118. In some embodiments, sensor(s) 252 are coupled to turbine controller 202 for sending measurements to turbine controller 202 for processing thereof. Sensor(s) 252 may be any suitable sensor having any suitable location within or remote to wind turbine 10, such as, but not limited to, Hall effect current transducers (CTs) and/or capacitive voltage transducers (CVTs).

Electrical and control system 201 may also include one or more acoustical sensors 55 coupled to turbine controller 202 for sending measurements to turbine controller 202 for processing thereof. Sensors 55 may be any suitable sensor having any suitable location within or remote to wind turbine 10, such as, but not limited to, anemometers.

Electrical and control system 201 may also include one or more other sensors (not shown) coupled to one or more components of wind turbine 100 and/or the electrical load, whether or not such component(s) are described or illustrated herein, for measuring parameters of such component(s). Such other sensor(s) may include, but are not limited to, sensors configured to measure displacements, yaw, pitch, moments, strain, stress, twist, damage, failure, rotor torque, rotor speed, an anomaly in the electrical load, and/or an anomaly of power supplied to any component of wind turbine 100. Such other sensors may couple to any component of wind turbine 100 and/or the electrical load at any location thereof for measuring any parameter thereof, whether or not such component, location, and/or parameter is described and/or illustrated herein.

Electrical and control system 201 typically includes a variable blade pitch system 56 for controlling, including but not limited to changing, a pitch angle of rotor blades 108 (shown in FIGS. 1-3) in response to a condition such as wind speed.

Referring again to FIG. 3, in some embodiments, turbine controller 202 and control system(s), respectively, include a bus 62 or other communications device to communicate information. One or more processor(s) 64 are coupled to bus 62 to process information, including information from anemometry 49, sensors 48, 50, 52, 252 and/or 55, and/or other sensor(s). Turbine controller 202 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. Turbine controller 202 may also include one or more read only memories (ROM) 70 and/or other static storage devices coupled to bus 62 to store and provide static (i.e., non-changing) information and instructions to processor(s) 64. Input/output device(s) 72 may include any device known in the art to provide input data to turbine controller 202 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless, providing access to one or more electronically-accessible media, etc. In some embodiments, hard-wired circuitry can be used in place of or in combination with software instructions. Thus, execution of sequences of instructions is not limited to any specific combination of hardware circuitry and/or software instructions, whether described and/or illustrated herein. Turbine controller 202 may also include a sensor interface 74 that allows turbine controller 202 to communicate with anemometer 49, sensors 48, 50, 52, 252 and/or 55, and/or other sensor(s) as well as inverter 221 and/or generator 118. Sensor interface 74 can be or can include, for example, one or more analog-to-digital converters that convert analog signals into digital signals that can be used by processor(s) 64.

Figure 4:
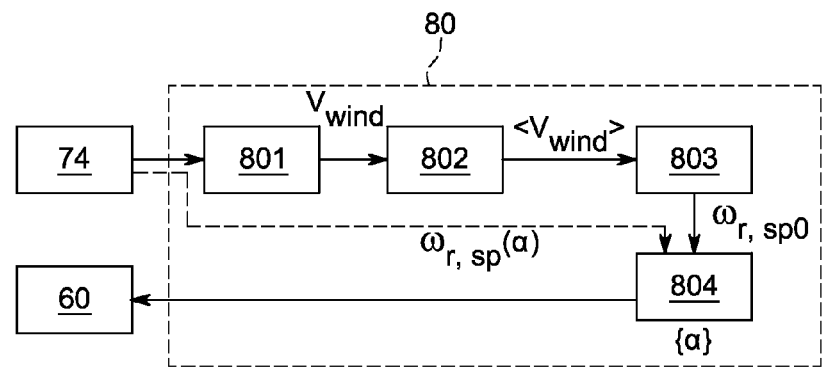
FIG. 4 is a schematic view of a speed control module of a wind turbine according to an embodiment.

FIG. 4 is a schematic view of a rotor speed control module 80 for controlling a wind turbine as explained above with reference to FIGS. 1 to 3. Rotor speed control module 80 may be used with any wind turbine having a rotor with variable rotor speed during normal operation of the wind turbine. Variable speed operation of the rotor may, for example, be achieved using a DFIG configuration as explained above with regard to FIG. 2 or by using a full power converter as explained above with regard to FIG. 3. Alternatively or in addition, variable rotor speed operation may be achieved using a gearbox with flexible gear ratio. Rotor speed control module 80 includes a wind speed module 801, 802 which is configured to determine an expected wind speed from one or several input values. The one or several input values may, for example, be received from a sensor interface 74 of the turbine controller as explained above with regard to FIG. 3. The one or several input values may include an operational status or state of the wind turbine, typically an output power of a power conversion assembly of the wind turbine which is connected to the rotor, a load of the wind turbine and/or a noise emission of the wind turbine. The one or several input values typically correspond to measured values but may also be preprocessed using appropriate models.

In the exemplary embodiment, wind speed module 801, 802 includes a wind speed estimator module 801 which is configured to receive the at least one input value and to calculate an expected wind speed $v_{wind}$ from the at least one operational status using a model of the wind turbine. For example, the power production of the power conversion assembly is used as input of wind speed estimator module 801 for calculating the expected wind speed $v_{wind}$. A wind speed averaging module 802 is connected with the wind speed estimator module 801 and configured to calculate moving averages $<v_{wind}>$ of the expected wind speed $v_{wind}$. The term "expected wind speed" as used herein intends to describe a wind speed that is expected to act on the rotor. The term "expected wind speed" shall embrace a current wind speed and a wind speed for the near future, for example about 100 μs to about 100 ms ahead of the present time at which the calculation is performed. Typically, the moving averages $<v_{wind}>$ of the expected wind speed $v_{wind}$ are obtained by time averaging the expected wind speed $v_{wind}$ for a short period of time of for example less than about 100 ms and issued every few ten microseconds up to or every few ten milliseconds. Calculating the expected wind speed $v_{wind}$ using wind turbine models has been found to produce more reliable results than directly measuring the wind speed using for example an anemometer. However, the measured wind speed may be additionally used to even further increase reliability of the expected wind speed and/or to check the plausibility of the used estimation. Furthermore, using moving averages reduces fluctuations and thus allows for more stable control schemes of the wind turbine. Knowledge of expected wind speed facilitates optimizing power production and/or reducing noise emission of the wind turbine.

The moving averages $<v_{wind}>$ of the expected wind speed $v_{wind}$ are issued to a first rotor speed module 803 which is configured to determine a first rotor speed setpoint $\omega_{r,sp0}$ for the averaged expected wind speed $<v_{wind}>$. For example, the first rotor speed setpoint $\omega_{r,sp0}$ may be obtained as $\omega_{r,sp0}=a^*<v_{wind}>+b$ with constants a and b that may also depend on the averaged wind speed $<v_{wind}>$ (see also FIG. 8 below). The first speed setpoints $\omega_{r,sp0}$ may also be generated using internal operating variables of the wind turbine, for example the produced power, or more complex functional relationships between different internal variables used as input values.

Typically, the first rotor speed setpoint $\omega_{r,sp0}$ is determined such that the noise emission of the wind turbine for the expected wind speed is reduced compared to nominal noise emission at the expected wind speed. Nominal noise emission of the wind turbine corresponds to noise emission of the wind turbine when the power output of the power conversion assembly is optimized during partial-load operation, i.e. below rated wind speed of the wind turbine, and when the power output of the power conversion assembly is set to the rated power output during full-load operation of the wind turbine, respectively.

According to an embodiment, a second rotor speed module 804 is connected to the first rotor speed module 803 for receiving the first rotor speed setpoint $\omega_{r,sp0}$ and configured to determining a second rotor speed setpoint $\omega_{r,sp}$ as a function of the first rotor speed setpoint $\omega_{r,sp0}$ and a trade-off parameter α.

Depending on trade-off parameter α, power production and noise emission of the wind turbine is balanced. According to an embodiment, the second rotor speed module 804 calculates the second rotor speed setpoint $\omega_{r,sp}$ as a linear function of the first rotor speed setpoint $\omega_{r,sp0}$ and the trade-off parameter α. For example, the second rotor speed setpoint $\omega_{r,sp}$ may be obtained as follows:

$$\omega_{r,sp}=\alpha\omega_{r,sp0}+(1-\alpha)\omega_{r,nom} \tag{1}$$

with rated rotor speed $\omega_{r,nom}$. If the trade-off parameter α is zero, the wind turbine is operated without speed regulation, i.e. the power production is optimized. For α=1 the wind turbine is operated at full speed regulation resulting in low noise operation. Typically, the wind turbine is be operated somewhere in between, i.e. 0<α<1, to trade-off noise emission and power production. In the exemplary embodiment, the trade-off parameter α may be chosen between 0 and 1. This is however only to be considered as an example for interpolating between full power production and full noise reduction of the wind turbine. The second rotor speed setpoint $\omega_{r,sp}(\alpha)$ is in the following also referred to as weighted rotor speed setpoint $\omega_{r,sp}(\alpha)$.

Furthermore, the trade-off parameter α may be changed during operation as function of operational variables of the wind turbine such as power production, load and noise emission. This is indicated in FIG. 4 by the dashed arrow.

Even further, the trade-off parameter α may be time dependent (day/night) or even controlled by the user depending on external events. For example, the trade-off parameter α may be set to a value different to 1, for example to or close to zero, for a certain period of time allowing thus a transient (short period of time) violation of the noise requirement depending on external or internal events or variables.

The trade-off parameter α may also be embedded in a more complex functional relationship that may depend on internal as well as external measurements and conditions. A more general expression can be of the following form:

$$\omega_{r,sp} = F(\alpha, \omega_{r,sp0}, \beta) \quad (2)$$

with function F where β is a vector of internal and external measurement signals.

For example, a noise control signal may be used as input signal β for rotor speed control module 80. The noise control signal may be received based upon preprogrammed conditions such as a desire to avoid generating noise at or above a predetermined level at certain times in a 24-hour period or other period. In an exemplary embodiment, the noise control mode may be initiated in response to a user input providing the control signal. The control signal may be generated in response to the user input indicating the user's detection of noise or the user's desire to avoid generating noise at or above a preselected level or to sense an external condition like the absence of people at a nearby residence and allow higher noise levels until people come home. Additionally or alternatively, the user input can identify the preselected level to be avoided by identifying a specific decibel limit or other suitable limit. The control process may be a stand-alone process or program, or the control process may be incorporated into a larger control process or program, such as a control program focused on efficiency of the system.

Typically, rotor speed control module 80 forms a part of a control system for controlling the wind turbine. Rotor speed control module 80 may be realized as a separate controller communicating with other controllers of the wind turbine. Alternatively, rotor speed control module 80 may be realized as a program block and/or program thread running on a common controller, for example on the turbine controller, and communicating with other program blocks and program threads, respectively, running on the common controller. Furthermore, sub-modules 801, 802, 803, 804 may be realized as a separate controllers or as respective program blocks and/or program threads running on a common rotor speed controller or the turbine controller.

Typically, the second rotor speed setpoint $\omega_{r,sp}$ is used to determine a corresponding torque for the power conversion assembly. For example, the second rotor speed setpoint $\omega_{r,sp}$ may be issued to a torque and pitch control module 60 which is explained in the following.

Figure 5:
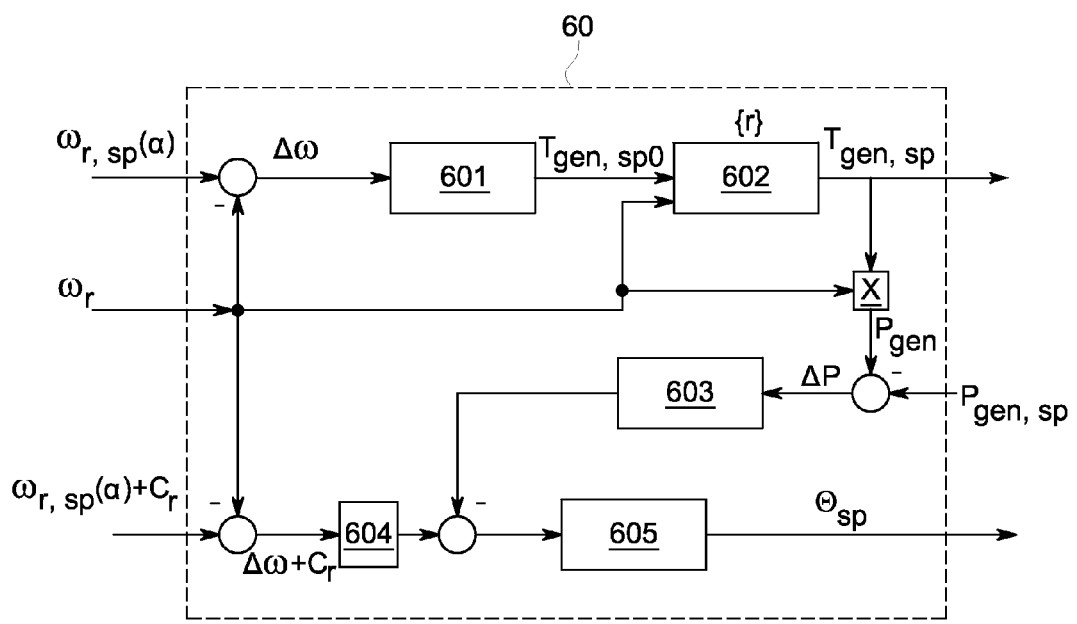
FIG. 5 is a schematic view of a torque and pitch control module of a wind turbine according to an embodiment.

FIG. 5 is a schematic view of an exemplary torque and pitch control module 60 for controlling a wind turbine as explained above with reference to FIGS. 1 to 3. Torque and pitch control module 60 is typically connected with rotor speed control module 80 explained above with regard to FIG. 4. Torque and pitch control module 60 may be realized as a separate controller or as part of a common controller, typically the turbine controller.

In the exemplary embodiment, torque and pitch control module 60 receives four input values, namely a power setpoint $P_{gen,sp}$ of the power conversion assembly, a measured rotor speed $\omega_r$, the second rotor speed setpoint $\omega_{r,sp}(\alpha)$ as obtained from the rotor speed control module, and the second rotor speed setpoint $\omega_{r,sp}(\alpha)$ increased by a constant $c_r$ of for example a few to a few ten rotations per minute (rpm). It goes without saying, that the value $\omega_{r,sp}(\alpha)+c_r$ may also be calculated internally by a torque and pitch control module 60 having three input lines only. Typically, torque and pitch control module 60 calculates a torque setpoint $T_{gen,sp}$ for the power conversion assembly, for example the generator connected to the rotor or an inverter connected to the generator, and pitch angle setpoints θ for the one or more rotor blade attached to the rotor. This is illustrated by the two output lines and arrows leaving torque and pitch control module 60.

Torque and pitch control module 60 is typically also configured to generate power setpoints for the power conversion assembly and/or pitch angle offsets for the pitch system. Pitch angle offsets can be used to avoid an increase of noise due to separation, i.e. an increase of the angle of attack beyond a certain blade specific values. The noise emission of the wind turbine is mainly determined by two variables, namely the rotor speed and the angle of attack of the rotor blades. Both can be controlled separately, the first by adjusting the speed through the torque and the latter by adjusting the pitch by appropriately specifying pitch angle setpoints and pitch angle offsets, respectively.

In the exemplary embodiment, torque and pitch control module 60 determines a first rotor speed difference Δω between the second rotor speed setpoint $\omega_{r,sp}(\alpha)$ and the measured rotor speed $\omega_r$. The first rotor speed difference Δω is used as input value of a first speed module or sub-controller 601 which is configured to calculate a first torque setpoint $T_{gen,sp0}$. The first torque setpoint $T_{gen,sp0}$ is transmitted to a dynamic torque limiting module 602. Typically, dynamic torque limiting module 602 also receives measured rotor speed $\omega_r$ as input value. Depending on a torque gain parameter r, which may also be changed during operating the wind turbine, a second torque setpoint $T_{gen,sp}$ is calculated by dynamic torque limiting module 602.

According to an embodiment, dynamic torque limiting module 602 determines the second torque setpoint $T_{gen,sp}$ such that the control system tracks a constant tip speed ratio λ* which depend on a torque gain parameter r.

Dynamics of the rotor, i.e. of rotor speed $\omega_r$, may be described as $$\dot{\omega}_r = \frac{1}{2J_r} \rho \pi R^5 \left( \frac{c_p(\lambda, \theta)}{\lambda^3} - r \frac{c_{p,max}}{\lambda_*^3} \right) \omega_r^2 \quad (3)$$

where $J_r$, ρ, $c_p$, $c_{p,max}$ are the inertial momentum of the rotor having a radius R, air density, coefficient of power of the rotor, and maximum coefficient of power of the rotor, respectively. The coefficient of power $c_p$ depends, for given rotor and blades, on tip speed ratio λ and pitch angle θ. The tip speed ratio λ is determined as rotor speed $\omega_r$ times radius R of the rotor divided by the wind speed $v_{wind}$. Any variations in the wind speed are reflected in the corresponding tip speed ratio λ. These variations impact the first term on the right-hand side of equation (3) and since the dynamics of the turbine are slower, the wind turbine tracks those variations with a delay. The wind turbine thus tracks a constant tip speed ratio λ* by adjusting its rotor speed $\omega_r$ to compensate for variations in the wind.

For given tip speed ratio λ*, the second torque setpoint $T_{gen,sp}$ is typically determined as $$T_{gen,sp} = r\frac{C_{p,max}}{\lambda_*^3}\omega_r^2$$

Accordingly, the torque gain parameter r reflects the aimed reduction of tip speed ratio $\lambda^*$. The torque gain parameter r is typically larger than zero. If the torque gain parameter r equals 1, the control system controls the wind turbine such that optimal power production maximum is achieved. If the tip speed ratio is to be reduced, a value greater than 1 is to be chosen.

In contrast to the previous strategies, namely SPM (Sound Power Management) and NRO (Noise-reduced Operations), where only the torque gain parameter r is used to achieve the desired behavior, the proposed strategy uses in addition speed regulation to achieve the targeted reduction of the noise. The speed regulation strategy forces the turbine to further follow a prescribed speed trajectory and thus reduces the speed excursions (large acceleration and decelerations) observed in normal operation as well as in SPM and NRO operations. By appropriately choosing the trade-off parameter $\alpha$ and the torque gain parameter r, both SPM operation and NRO operation may be realized. This allows for a more flexible noise reduction compared to using only SPM operation or NRO operation of the wind turbine.

Simulations and preliminary field validation have shown large excursions of rotor speed even for the case where low tip speed ratios $\lambda^*$ are targeted. These variations are often not acceptable from the noise perspective. Due to additional rotor speed regulation as explained above with regard to FIG. 4, excursions of rotor speed $\omega_r$ are avoided or at least significantly reduced. Accordingly, noise emission of the wind turbine may be reduced and/or a better trade-off between power production and noise emission of the wind turbine may be achieved.

Furthermore, the second torque setpoint $T_{gen,sp}$ is typically multiplied by the measured rotor speed $\omega_r$ to calculate an expected power $P_{gen}$, which may be an actual power or a power in the near future. The power difference $\Delta P$ between the expected power $P_{gen}$ and the power setpoint $P_{gen,sp}$ is used as input of a cross-term module 603. The output of the cross-term module 603 is compared with the output of a second speed module 604 to decouple the torque setpoint calculating part and the pitch angle setpoint calculating part of torque and pitch control module 60. For example, the second speed module 604 receives a second rotor speed difference $\Delta\omega+c_r$ and calculates an output which is compared with the output of the cross-term module 603 so that a pitch limiting module 605 outputs a pitch angle setpoint $\Theta_{sp}$ only at large enough weighted difference between rotor speed setpoint $\omega_{sp}$ and measured rotor speed $\omega_r$ on the one hand and power difference $\Delta P$ on the other hand. If the output of the block 603 is high, issuing pitch angle setpoints is blocked and only the pitch angle offset is in action. If the output of the cross-term module 603 is low, the output of the second speed module 604 dominates and a pitch angle setpoint usually different form the pitch angle offset is sent to the pitch system.

Figure 6:
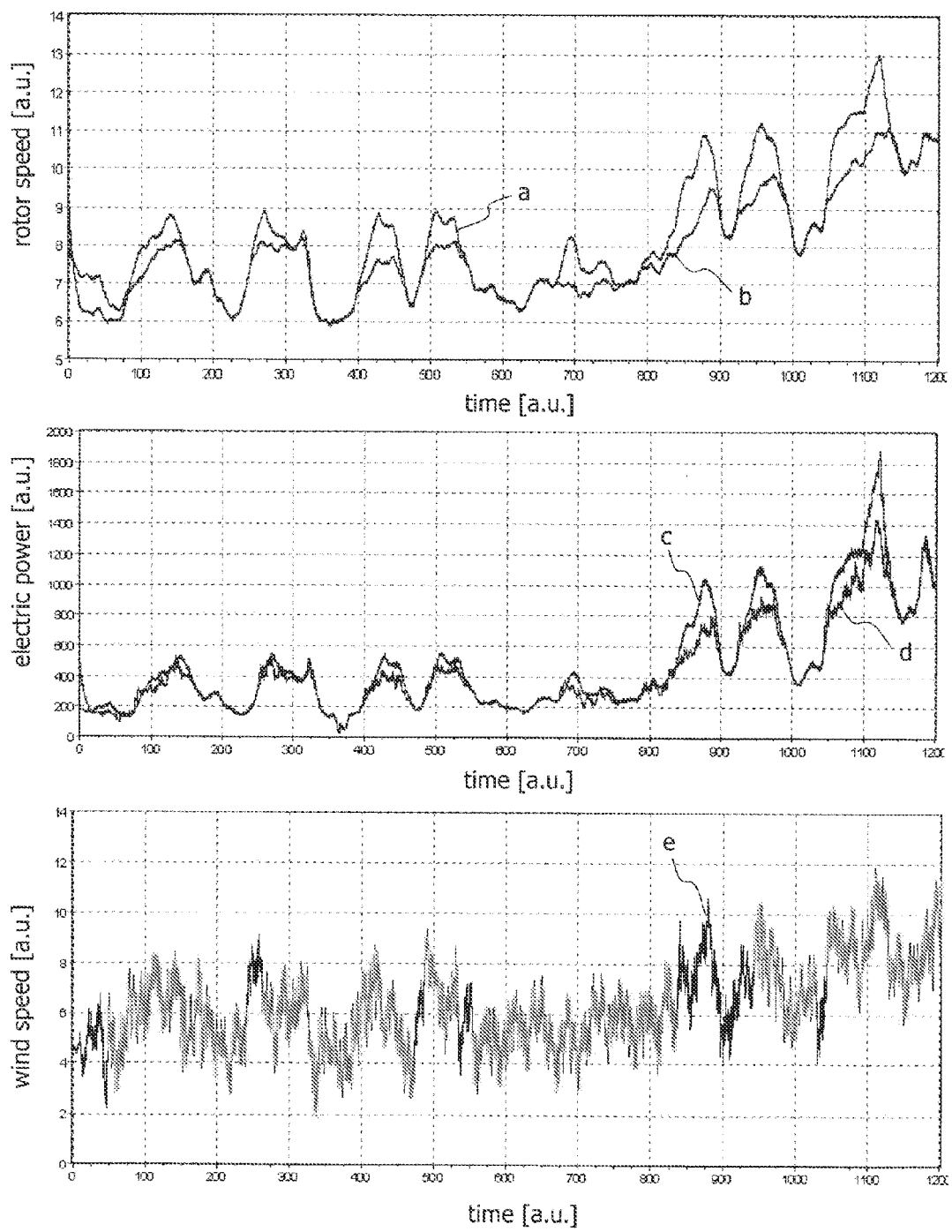
FIG. 6 shows exemplary curves for rotor speed and electric power of a wind turbine according to embodiments.

FIG. 6 shows exemplary curves for rotor speed (curves a, b) and electric power (curves c, d) of a wind turbine as obtained by simulations for given wind speed (curve e) below rated wind speed of the wind turbine. Simulations were performed using a wind turbine model including a control scheme as explained above with regard to FIGS. 4 and 5, wherein the second rotor speed setpoint $\omega_{r,sp}$ was set in accordance with equation (1) and wherein the torque gain parameter r in equation (3) was set to 1. Curves a and c in FIG. 6 correspond to full power operation ($\alpha=0$ in equation 1), i.e. without rotor speed regulation. Curves b and d in FIG. 6 correspond to full noise controlled operation ($\alpha=1$ in equation 1), i.e. with full speed regulation.

The power production is, on average, lower using full rotor speed regulation (curve d) compared to full power operating the wind turbine (curve c). However, excursions of rotor speed are significantly lower for full rotor speed regulation (curve b) compared to full power operating the wind turbine (curve a). Accordingly noise emission of the wind turbine can significantly be reduced by using rotor speed regulation. Depending on noise level and external conditions, trade-off parameter $\alpha$ and/or torque gain parameter r may be set to different values in the range from zero to one and/or changed during operation.

Figure 7:
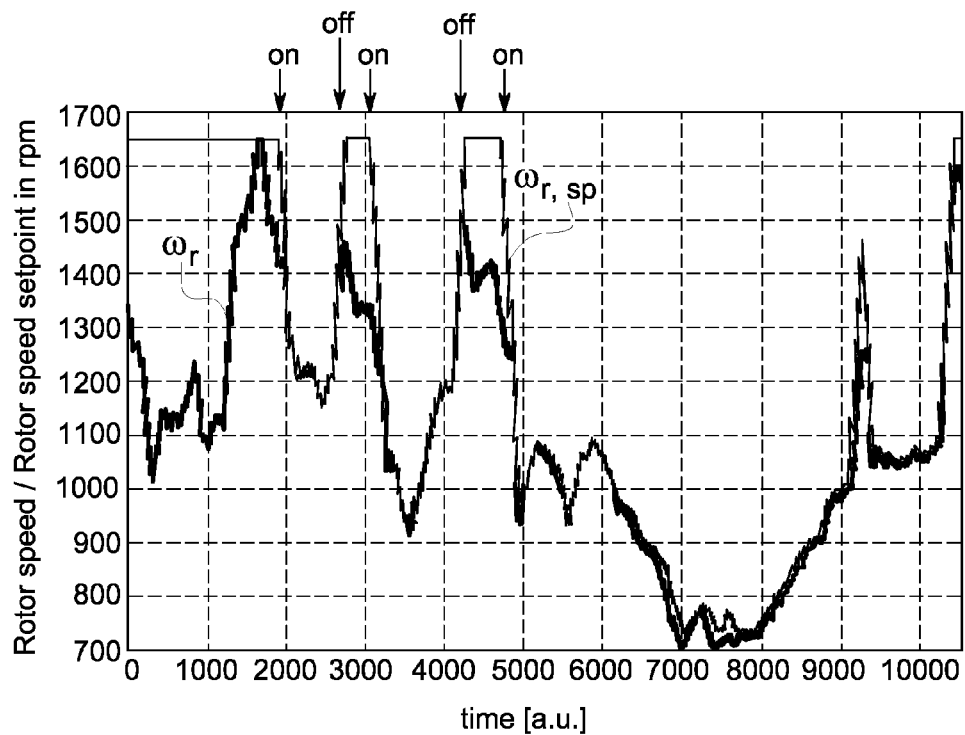
FIG. 7 shows exemplary curves for rotor speed and rotor speed setpoint of a wind turbine according to embodiments.

FIG. 7 shows exemplary curves for rotor speed $\omega_r$ and the second rotor speed setpoint $\omega_{r,sp}$ of a wind turbine wind with implemented noise control scheme as explained above with regard to FIGS. 4 and 5. The second rotor speed setpoint $\omega_{r,sp}$ was set in accordance with equation (1) and the torque gain parameter r in equation (3) was set to 1. Curves for rotor speed $\omega_r$ and the second rotor speed setpoint $\omega_{r,sp}$ correspond to a field test. At several times the trade-off parameter $\alpha$ was switched from 0 to 1 to enable full rotor speed regulation as indicated by the arrows labeled "on". In between, the trade-off parameter $\alpha$ was switched back to 0 for full power operation of the wind turbine. During full rotor speed regulation ($\alpha=1$), i.e. when the rotor speed is used as a controlled variable for controlling the wind turbine, the rotor is slowed down. Thus the apparent noise emitted by the wind turbine is typically reduced (measurements not shown).

Figure 8:
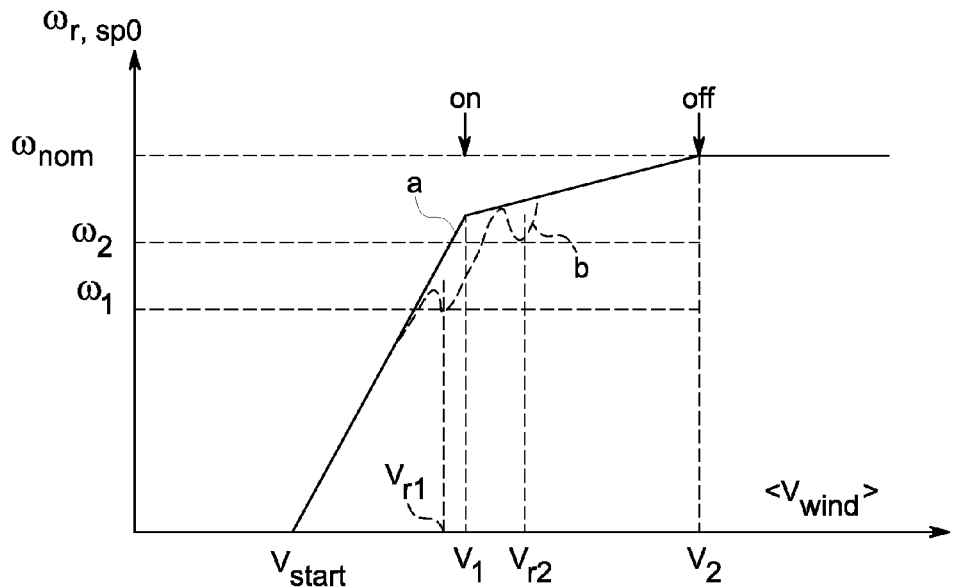
FIG. 8 shows exemplary curves for the rotor speed setpoint of a wind turbine according to embodiments.

FIG. 8 shows exemplary curves a, b for the first rotor speed setpoint $\omega_{r,sp0}$ that may be used for wind turbine controlling. The second rotor speed setpoint $\omega_{r,sp}$ is identical to the first rotor speed setpoint $\omega_{r,sp0}$ when the trade-off parameter $\alpha$ in equation (1) is set 1. When $\alpha$ in equation (1) is set zero, the second rotor speed setpoint $\omega_{r,sp}$ corresponds to rated rotor speed. In an exemplary embodiment, the trade-off parameter $\alpha$ changes during operation between the values 0 and 1.

The rotor speed setpoint $\omega_{r,sp0}$ of curve a is chosen as a piece-wise linear function of averaged wind speed $<v_{wind}>$ with different slopes which depend on the wind speed region. In a low wind speed region for averaged wind speeds between $v_{start}$ and $v_1$, the slope is highest. Above rated wind speed $v_2$, i.e. in the full load wind speed region, the slope is zero and thus the second rotor speed setpoint $\omega_{r,sp}$ set constant to rated rotor speed $\omega_{norm}$. Between $v_1$ and rated wind speed $v_2$ corresponding to a high wind region of the partial load wind speed region, the slope of the second rotor speed setpoint $\omega_{r,sp}$ as function of averaged wind speed $<v_{wind}>$ is set lower compared to the low wind speed region.

The dotted curve b represents a more tailored speed operation corresponding to an example where noise reduction is achieved using a non-monotonic function of averaged wind speed $<v_{wind}>$. In the exemplary embodiment, noise emitted by the wind turbine at averaged wind speeds $v_{r1}$ and $v_{r1}$ is less than for averaged wind speeds close to $v_{r1}$ and $v_{r1}$, respectively. This applies once the pitch parameters and other operational parameters of the wind turbine are set correctly. Note that the wind turbine noise is driven not only by the tip speed but also by the angle of attack.

According to an embodiment, the rotor speed is controlled using both the torque and the angle of attack which is adjusted using the pitch system of the wind turbine. Accordingly, the noise control is decoupled and both control inputs can be used to reduce a component of the noise.

Figure 9:
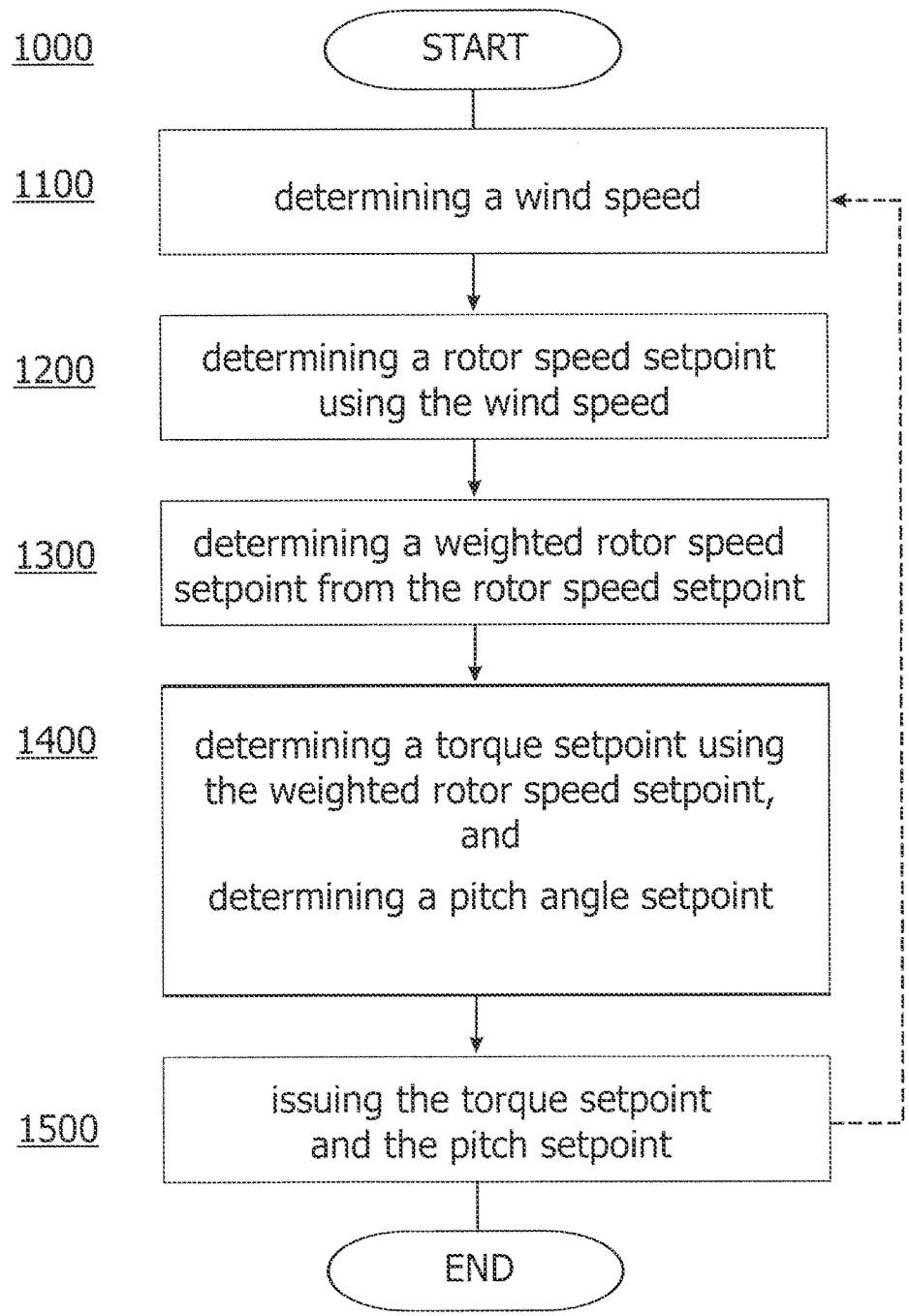
FIG. 9 is a flow diagram for reducing noise emission of a wind turbine rotor according to an embodiment.

FIG. 9 is a flow diagram of a method 1000 for noise-reduced operation a wind turbine having a rotor with variable rotor speed which is connected to a power conversion assembly. In a first block 1100, a wind speed is determined, for example estimated. Thereafter, a first rotor speed setpoint is determined for the estimated wind speed in a block 1200. In a block 1300, a weighted rotor speed setpoint (second rotor speed setpoint) is determined using the first rotor speed setpoint. Blocks 1200 and 1300 may also be considered as a single block of determining the weighted rotor speed setpoint. The weighted rotor speed setpoint is typically determined such that a noise emission of the wind turbine for the wind speed is reduced compared to nominal noise emission at the wind speed, as explained above with regard to FIG. 4.

Blocks 1100 to 1300 are typically performed by a controller of the wind turbine, for example the turbine controller, as explained above with regard to FIG. 4. For example, the weighted rotor speed setpoint may be determined as a linear function of the first rotor speed setpoint and a trade-off parameter α (equation 1).

Alternatively, a more complex function as given by equation (2) may be used to determine the weighted rotor speed setpoint. For example, the weighted rotor speed setpoint may be determined as a function of the first rotor speed setpoint, the trade-off parameter α and an internal state of the wind turbine and/or an external condition. In this embodiment, method 1000 further includes determining the internal state of the wind turbine and the external condition, respectively.

According to an embodiment, a torque setpoint for the power conversion assembly of the wind turbine is determined using the weighted rotor speed setpoint in a block 1400. Furthermore, a pitch angle setpoint for the one or more rotor blades is typically determined using the torque setpoint. Alternatively, the pitch angle setpoint is determined based on the wind speed, the weighted rotor speed setpoint and the actual turbine speed. The processes of block 1400 are typically also performed on a controller as explained above with regard to FIG. 5.

In a block 1500, the torque setpoint and the pitch angle setpoint are typically issued to the power conversion assembly and the pitch system, respectively. Accordingly, the noise emission of the wind turbine is typically reduced.

According to an embodiment, method 1000 is a closed-loop method as indicated by the dashed arrow in FIG. 9. Typically, the torque setpoint is determined such that the tip speed ratio of the rotor blades mounted to the rotor are substantially constant at least for a certain time period in which no change of the trade-off between noise emission and power production is required. Depending on external conditions and day time this balance may be changed, for example, by changing the trade-off parameter α. Thereby, operating the wind turbine with variable tip speed ratios can be achieved.

Methods 1000 may be used to reduce noise emission both at wind speeds above rated wind speed or at lower wind speeds, i.e. during partial load operation. At wind speeds above rated wind speed, the noise generated by the wind turbine may be less than the background noise. Accordingly, the rotor speed may only be used as a controlled variable when the determined wind speed is below rated wind speed of the wind turbine.

Figure 10:
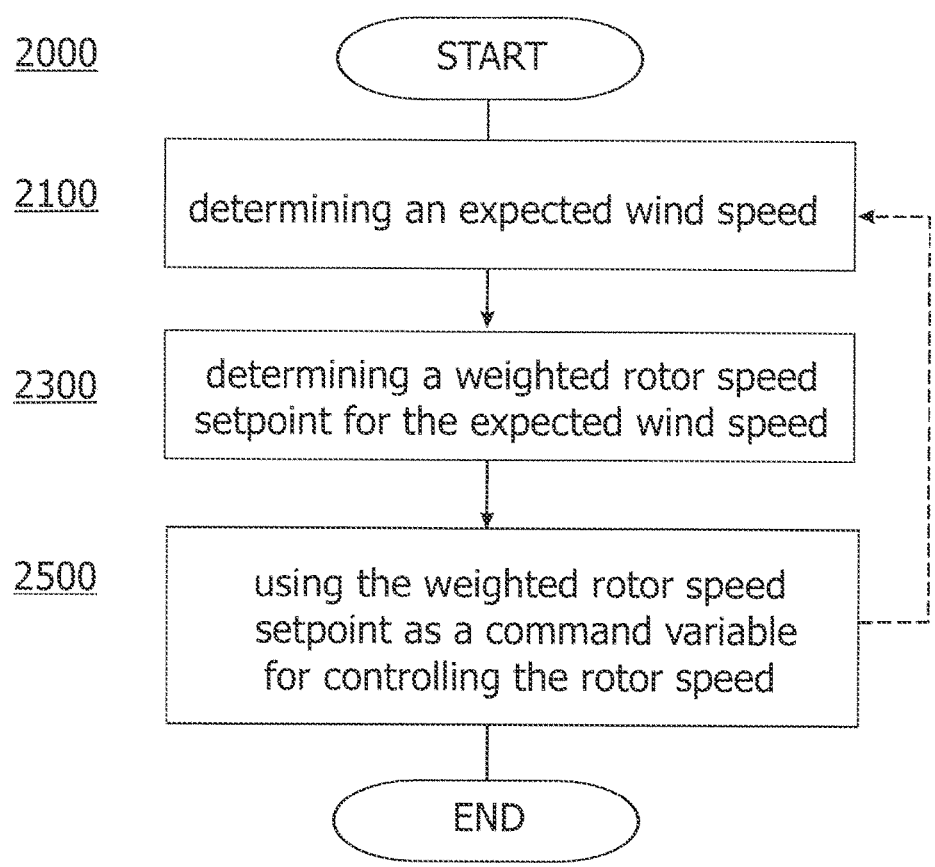
FIG. 10 is a flow diagram for reducing noise emission of a wind turbine rotor according to another embodiment.

FIG. 10 is a flow diagram of a method 2000 for noise-reduced operation a wind turbine having a rotor with variable rotor speed. In a first block 2100, an expected wind speed is determined, for example a wind speed that is expected for the next time interval is determined. The expected wind speed may also be a current wind speed. Thereafter, a weighted rotor speed setpoint for a rotor of the wind turbine that is lower than a rated rotor speed the rotor is determined in a block 2300. The weighted rotor speed setpoint is used as a command variable for controlling the rotor speed wind turbine in a block 2500. By using the weighted rotor speed setpoint as a command variable the rotor speed of the rotor used as a controlled variable for controlling the wind turbine, in particular during partial-load operation of the wind turbine. Accordingly, the noise emission of the wind turbine may be reduced.

Typically, method 2000 is used as a closed-loop control as indicated by the dashed arrow.

Determining the expected wind speed may include measuring a wind speed, estimating a wind speed, and/or averaging previously determined wind speeds to determine an averaged wind speed.

According to an embodiment, block 2300 includes determining a first rotor speed setpoint for the expected wind speed and determining the weighted rotor speed setpoint as a function of the first rotor speed setpoint and a trade-off parameter α, as explained above.

Determining the first rotor speed setpoint typically includes calculating the expected wind speed using a model of the wind turbine, and/or calculating the first rotor setpoint using a predefined function of the estimated wind speed. Calculating the first rotor setpoint typically results in a value that is lower than a rotor speed corresponding to maximum power uptake of the rotor at the expected wind speed.

Block 2500 typically includes determining a torque setpoint using the weighted rotor speed setpoint, determining a pitch angle setpoint and/or issuing the torque setpoint and the pitch angle setpoint to a power conversion assembly and a pitch system, respectively.

Blocks 2100 to 2500 are typically performed by a controller of the wind turbine, for example the turbine controller, as explained above with regard to FIG. 4. The second rotor speed setpoint may be determined as a linear function of the first rotor speed setpoint and a trade-off parameter α (equation 1) or as a more complex function as given by equation (2) further taking into account a measured or estimated state of the wind turbine and/or an external condition. The state of the wind turbine may be the output power of the wind turbines power conversion assembly, a load of the wind turbine and/or a noise emission of the wind turbine.

According to an embodiment, the torque setpoint for the power conversion assembly of the wind turbine is determined using the second rotor speed setpoint as explained above with regard to FIG. 5.

The torque setpoint is typically determined such that a tip speed ratio of a rotor blade mounted to the rotor is, at least for a certain time period in which no change of noise emission is aimed, substantially constant when method 2000 is performed as a closed-loop control. The tip speed ratio is, at least below rated wind speed of the wind turbine, typically lower than a tip speed ratio corresponding to maximum power uptake. This may be achieved by setting the torque gain parameter r in equation (3) to a value above 1.

Similar as explained above with regard to FIG. 9, the pitch angle setpoint may be determined using the torque setpoint or independent of the torque setpoint using the weighted rotor speed setpoint.

Thereafter, the torque setpoint and typically also the pitch angle setpoint are issued to the power conversion assembly and the pitch system, respectively, in a block 2500. Accordingly, the noise emission of the wind turbine may be reduced and/or the balance between noise emission and power production adapted in accordance with external conditions.

Methods 1000 may be used to reduce noise emission both at wind speeds above rated wind speed or at lower wind speeds, i.e. during partial load operation. At wind speeds above rated wind speed, the noise generated by the wind turbine may be less than the background noise. Accordingly, the weighted rotor speed setpoint may only be used.

The embodiments described herein include methods and a control system for controlling a wind turbine having a rotor with variable rotor speed that allows reduced noise operation of the wind turbine. More specifically, the methods and the control system facilitate a trade-off between power production and noise emission of the wind turbine in a flexible manner.

Exemplary embodiments of systems and methods for methods and a control system for controlling a wind turbine are described above in detail. The systems and methods are not limited to the specific embodiments described herein, but rather, components of the systems and/or steps of the methods may be utilized independently and separately from other components and/or steps described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for noise-reduced operation of a wind turbine, comprising:
    determining a wind speed during normal operation of the wind turbine;
    determining a weighted rotor speed setpoint for a rotor of the wind turbine from a first rotor speed setpoint providing a reduced noise emission compared to nominal noise emission of the wind turbine at the wind speed and a parameter representing a tradeoff between power production and noise emission;
    determining, using the weighted rotor speed setpoint, a torque setpoint for a power conversion assembly connected to the rotor; and
    applying the torque setpoint to the power conversion assembly to control the wind turbine.

2. The method of claim 1, further comprising at least one of:
    determining, using at least one of the torque setpoint and the weighted rotor speed setpoint, a pitch angle offset for a pitch system of the wind turbine;
    determining a pitch angle setpoint using at least one of the torque setpoint and the weighted rotor speed setpoint; and
    applying the pitch angle setpoint to the pitch system of the wind turbine to control the wind turbine.

3. The method of claim 1, wherein the weighted rotor speed setpoint is determined as a linear function of the first rotor speed setpoint and the parameter.

4. The method of claim 1, further comprising determining a state of the wind turbine, wherein the weighted rotor speed setpoint is determined as a function of the first rotor speed setpoint, the state of the wind turbine and the parameter.

5. The method of claim 4, wherein the state of the wind turbine is at least one of an output power of the power conversion assembly, a load of the wind turbine and a noise emission of the wind turbine.

6. The method of claim 1, wherein determining the first rotor speed setpoint comprises at least one of:
    calculating the first rotor speed setpoint using a model of the wind turbine; and
    calculating the first rotor setpoint using a predefined function of the wind speed.

7. The method of claim 1, wherein calculating the first rotor setpoint results in a value that is lower than a rotor speed corresponding to maximum power uptake of the rotor at the wind speed.

8. The method of claim 1, wherein the method is a closed-loop method, and wherein the torque setpoint is determined such that a tip speed ratio of a rotor blade mounted to the rotor is substantially constant at least for several loops.

9. The method of claim 8, wherein the wind turbine is controlled such that the tip speed ratio is lower than a tip speed ratio corresponding to maximum power uptake.

10. The method of claim 1, further comprising changing the parameter to operate the wind turbine with a variable tip speed ratio.

11. The method of claim 1, wherein determining the wind speed comprises at least one of:
    measuring a wind speed;
    estimating a wind speed; and,
    averaging the measured wind speed or the estimated wind speed with previously determined wind speeds to determine the wind speed as an averaged wind speed.

12. A method for noise-reduced operation of a wind turbine, comprising:
    determining an expected wind speed;
    determining, using the expected wind speed, a weighted rotor speed setpoint for a rotor of the wind turbine that is lower than a rated rotor speed of the rotor, the weighted rotor speed setpoint determined from a first rotor speed setpoint providing a reduced noise emission compared to nominal noise emission of the wind turbine at the expected wind speed and a parameter representing a tradeoff between power production and noise emission; and,
    using the weighted rotor speed setpoint as a command variable for a rotor speed of the rotor used as a controlled variable for controlling the wind turbine during partial-load operation of the wind turbine.

13. The method of claim 12, wherein the weighted rotor speed setpoint is changed during partial-load operation of the wind turbine.

14. The method of claim 12, wherein using the weighted rotor speed setpoint comprises at least one of:
    determining, using the weighted rotor speed setpoint, a torque setpoint for a power conversion assembly connected to the rotor;
    determining a pitch angle offset for a pitch system of the wind turbine using at least one of the torque setpoint and the weighted rotor speed setpoint;

applying the torque setpoint to the power conversion assembly to control the wind turbine;

determining a pitch angle setpoint using at least one of the torque setpoint and the weighted rotor speed setpoint; and applying the pitch angle setpoint to the pitch system of the wind turbine to control the wind turbine.

15. A control system for controlling a wind turbine, comprising:

a wind speed module configured to determine a wind speed;

a rotor speed control module connected with the wind speed module for receiving the wind speed and configured to determine, depending on the wind speed, a weighted rotor speed setpoint for a rotor of the wind turbine from a first rotor speed setpoint providing a reduced noise emission compared to nominal noise emission of the wind turbine at the wind speed and a parameter representing a tradeoff between power production and noise emission; and a torque control module connected with the rotor speed module for receiving the weighted rotor speed setpoint and configured to determine, using the weighted rotor speed setpoint, a torque setpoint for a power conversion assembly of the wind turbine, the power conversion assembly comprising a generator connected to the rotor, the torque control module being further configured to issue the torque setpoint to the power conversion assembly of the wind turbine.

16. The control system of claim 15, wherein the torque control module comprises at least one of:

a torque limiting module configured to calculate the torque setpoint such that a tip speed ratio of a rotor blade mounted to the rotor remains substantially constant; and a pitch limiting module configured to calculate at least one of a pitch angle setpoint and a pitch angle offset using at least one of the weighted rotor speed setpoint and the torque setpoint.

17. The control system of claim 15, wherein the wind speed module comprises at least one of:

a wind speed estimator module configured to receive at least one operational status of the wind turbine and configured to calculate an expected wind speed using the at least one operational status as an input variable of a model of the wind turbine; and, a wind speed averaging module connected with the wind speed estimator module for receiving the expected wind speed and configured to transmit moving averages of the expected wind speed to the first rotor speed module.

* * * * *